United States Patent [19]

Multrus

[11] Patent Number: 4,522,220

[45] Date of Patent: Jun. 11, 1985

[54] DIAPHRAGM MODULE FOR PNEUMATIC CONTROL SYSTEMS

[75] Inventor: Vladimir Multrus, Limeshain, Fed. Rep. of Germany

[73] Assignee: Honeywell GmbH, Offenbach, Fed. Rep. of Germany

[21] Appl. No.: 462,588

[22] Filed: Jan. 31, 1983

[30] Foreign Application Priority Data

Feb. 6, 1982 [DE] Fed. Rep. of Germany ....... 3204100

[51] Int. Cl.[3] .............................................. G05D 16/00

[52] U.S. Cl. .............................................. 137/85; 92/97

[58] Field of Search ................. 137/82, 85, 86; 92/96, 92/97, 101

[56] References Cited

U.S. PATENT DOCUMENTS 3,169,402 2/1965 Baker ................................ 137/85 X 3,461,896 8/1969 Holloway ......................... 137/85 X 4,245,549 1/1981 Hardin ................................ 92/97 X

*Primary Examiner*—Alan Cohan

[57] ABSTRACT

A diaphragm module for pneumatic control systems comprises at least a pressure comparing stage and a force/pressure transducer controlled by said stage. The design of said module comprises chambers in a housing divided by diaphragms, wherein the force transmission between the diaphragms is achieved by intermediately arranged diaphragm disks. For a low friction mounting of the diaphragm disks in the housing without fixation with the intermediately arranged diaphragms the module comprises the following design: The diaphragm disks (36–39) comprise central pin projections (40) and recesses (44), wherein the pin projection of a diaphragm disk each is inserted into a recess of an adjacent diaphragm disk via a central hole (35) provided in the comparing or tightening diaphragm (31, 33, 34), respectively; the housing (11–16) and the diaphragm disk (36–39) comprise annular ribs (42) which are pressed into the diaphragms (30–34) for tightening when pressure is applied; and at least two diaphragm disks (36–39) comprise in their plane surfaces concentric annular grooves (43) which are engaged by annular collars (41) of related diaphragms (FIG. 1).

3 Claims, 4 Drawing Figures

DIAPHRAGM MODULE FOR PNEUMATIC CONTROL SYSTEMS

BACKGROUND OF THE INVENTION

The present invention relates to a diaphragm module for pneumatic control systems and particularly to such a system having a pressure comparing stage for converting an applied pressure difference into a force and a force/pressure transducer being controlled by the pressure comparing stage wherein, in a multiple-part housing, chambers are formed by comparing and tightening diaphragms with pressures to be compared with each other being applied to said chambers and wherein by means of diaphragm disks loosely piled up in the housing and being admitted by the comparing diaphragms the resulting force is accordingly converted into a displacement of the diaphragm disks. This diaphragm module may be used for the control of process variables in such devices as fluid-operated controllers, ratio relays, summation relays, etc. In known devices of this kind, as for instance described in the book of Hengstenberg "MeBen und Regeln in der chemischen Technik", Springer Verlag 1964, pages 1159 and 1179, in particular under reference to the diagrams 127 and 136, the whole diaphragm package is rigidly interconnected by means of a leading-in pin. Rigid clamping of the diaphragm disks to the diaphragms as well as leading through and fixation of said leading-in pin complicates centering of the whole diaphragm package and its parallel alignment with respect to the nozzle of the pressure/force transducer in those known controllers. In order to prevent an undesired hysteresis, a break in the characteristic and changes of the diaphragm areas, respectively, the known controllers use double diaphragms with an enforcement and with a vented interspace. Not only the number of required diaphragms is doubled, but the whole design becomes complicated which is an obstacle to the miniaturization of the device.

A pneumatic diaphragm module known from German Pat. No. 25 29 457 achieves an improvement with this respect. With this module the diaphragm disks are loosely stacked in the housing, wherein flat and thin comparing diaphragms are arranged between the disks and act to displace said disks. Tightening diaphragms having a negligible active area separate the individual stages from each other. Centering of the whole package of diaphragm disks is achieved by matching the diameter of the diaphragm disks to the recess of the housing. In order to provide an active diaphragm area, it is necessary to step off the diameter of the diaphragm disks. Whereas this known diaphragm module has given satisfactory results, problems with respect to permissible limits and friction arise due to the matching of the diameter of the diaphragm disks to the recess of the housing. This is particularly true if molded plastic parts are used.

SUMMARY OF THE INVENTION

It is, therefore, the object of the present invention to eliminate the tolerance problems while maintaining the other advantages as for instance loose stacking, inexpensive manufacturing, simple assembly, possible miniaturization, etc. The solution to this object is achieved according to the invention as claimed in claim 1. Further advantageous embodiments of the invention may be taken from the subclaims.

BRIEF DESCRIPTION OF THE DRAWINGS

With respect to embodiments shown in the figures of the attached drawing, the invention shall be further explained in connection with the drawings in which.

DETAILED DESCRIPTION

Figure 1A:
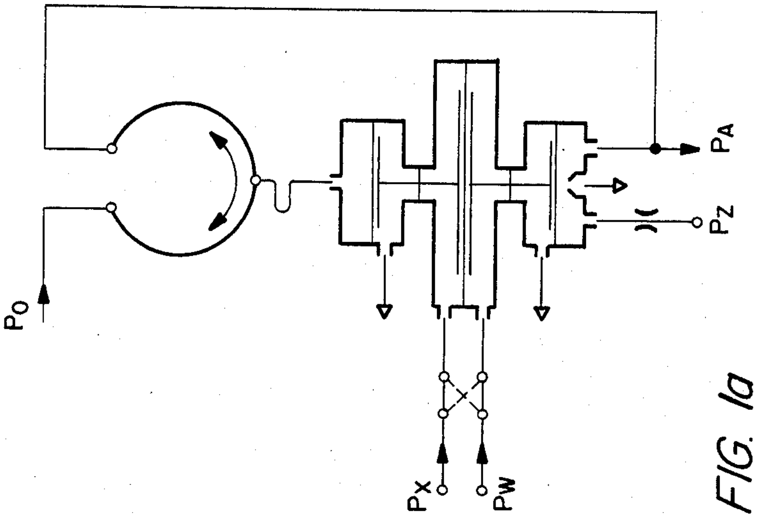
FIG. 1*a* shows the schematic design of the diaphragm module according to FIG. 1 together with its fluid connections in order to explain its function.
Figure 1:
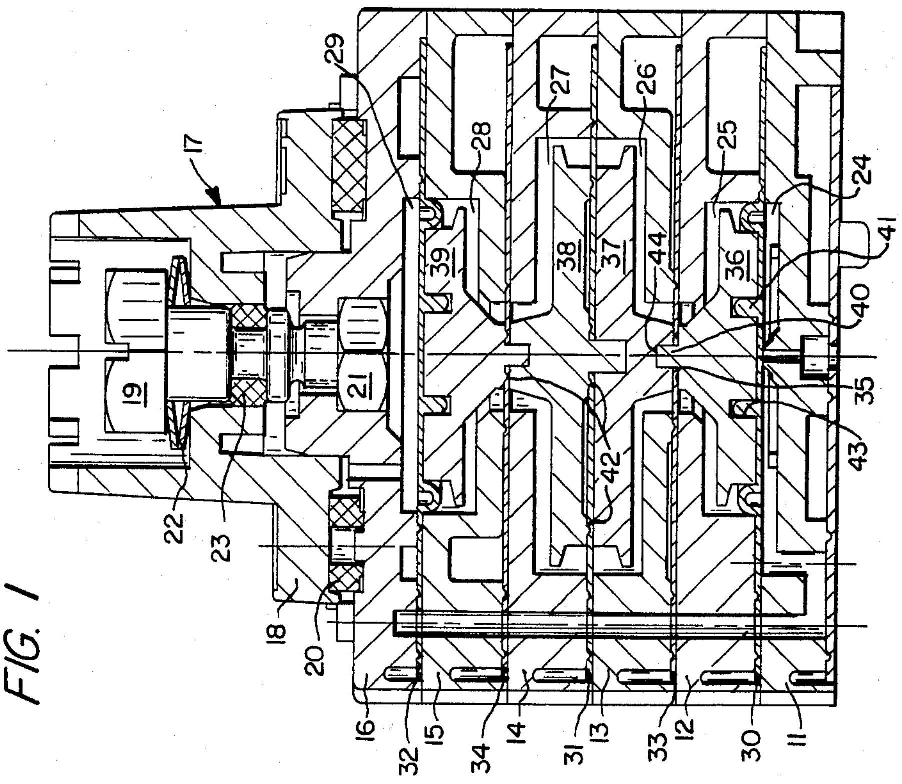
FIG. 1 shows the design of a first embodiment of the diaphragm module according to the invention in a longitudinal section.

According to FIG. 1 the pneumatic diaphragm module consists of a plurality of disk-shaped housing portions 11–16 being piled up on each other with said housing portions having built in air channels and chambers in a known manner which needs no discussion in the present case. The upper housing portion 16 at the same time forms the bottom portion of a pressure divider 17, the upper portion of which consists of a setting knob 18 which is pressed against the bottom portion 16 by means of a screw 19 with an elastical sealing ring 20 being intermediately arranged. The screw 19 cooperates with a lock nut 21 and an intermediately arranged cup spring 22 provides a defined contact pressure. By means of an O-ring 23 an additional seal is provided. The pressure divider 17 basically is a known pressure divider, the design of which has been described in the German published patent application No. 25 09 963. Therefore, a further explanation of the design and the operation of the pressure divider is deemed to be unnecessary.

Each housing portion 11–16 is provided with a central recess or chamber 24–29, respectively, wherein the chamber pairs 24, 25 and 26, 27 and 28, 29 face each other and are separated from each other by means of comparing diaphragms 30, 31 and 32. Tightening diaphragms 33 and 34 seal the individual systems from each other.

The comparing and tightening diaphragms arranged in the interior of the whole package each possess a central hole 35. Diaphragm disks 36–39 arranged in the recesses 25 to 28 by means of corresponding pin projections 40 via said holes 35 engage corresponding recesses 44 in the adjacent diaphragm disks. The depth of the recesses 44 is matched to the length of the pin projections 40 in such a way that annular ribs 42 of the diaphragm disks press the comparing and tightening diaphragms arranged between the diaphragm disks by a certain value to achieve a corresponding sealing action.

The diaphragm disks 36 and 39 each terminate the package and the comparing diaphragms 30, 32 to that extent show a particular design where the outer plane surfaces of the diaphragm disks 36 and 39 are provided with ring grooves 43 which are engaged by ring collars 41 of the diaphragms 30 and 32. Thus, the whole package is guided in its axial displacement and is protected against lateral displacement and asymmetry.

FIG. 1*a* again shows schematically the pneumatic diaphragm module according to FIG. 1 and its connection to signals. As a man skilled in the art easily may note, the module has the function of a pneumatic proportional controller, wherein the center comparing diaphragm compares the desired value $P_W$ to the measured value $P_X$. To the lowest chamber the supply air $P_Z$ is fed and this chamber partly is vented to atmosphere by means of a nozzle/flapper system which leads to a changing output pressure $P_A$ as a function of the comparison between the desired value $P_W$ and the measured value $P_X$. This output pressure $P_A$ is applied to the package of diaphragms and disks from the bottom side and the top side in order to achieve a negative feedback and a positive feedback respectively. The value of the positive feedback may be changed by means of the pressure divider, with $P_O$ being connected to a reference pressure.

Figure 2A:
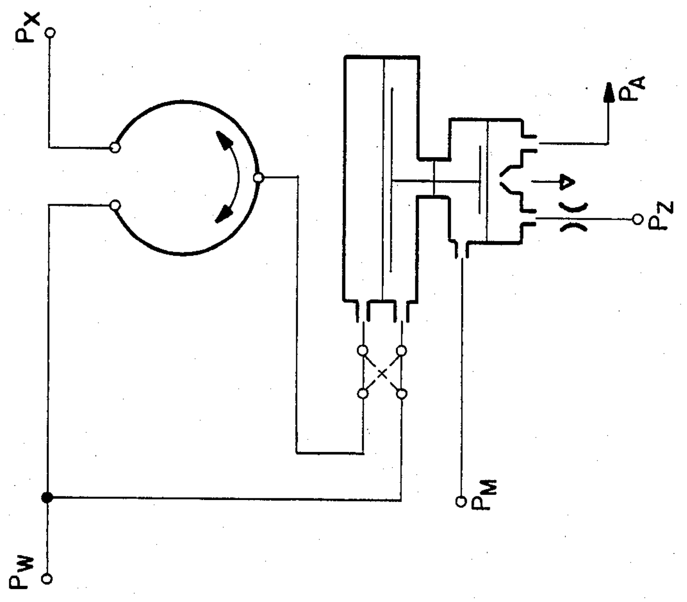
FIG. 2 shows the design of a second embodiment of the diaphragm module according to the invention in a longitudinal section; and, FIG. 2*a* shows the schematic design of the diaphragm module according to FIG. 2 together with its fluid connections in order to explain its function as a ratio module having an adjustable ratio coefficient.
Figure 2:
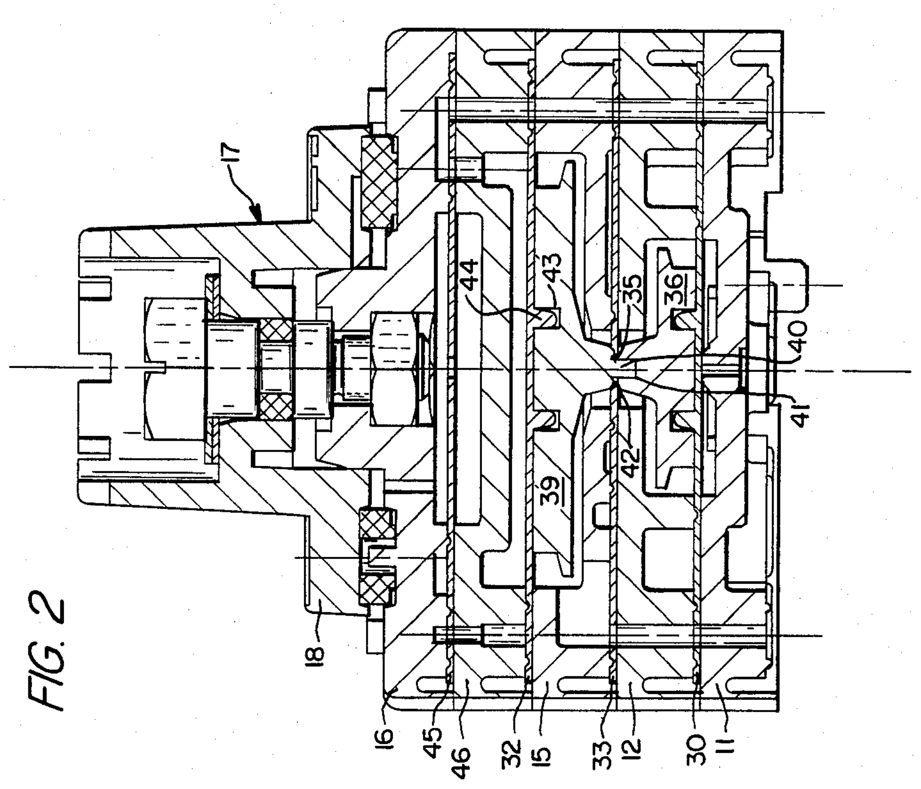

The embodiment shown in FIGS. 2 and 2*a* essentially deals with a ratio module, the design and function of which basically have been described in the German Pat. No. 25 29 457 with respect to FIGS. 2*a*–2*c*. The new design principles already described with respect to FIG. 1 also have been used with this module which becomes evident by the use of the same reference numbers. Therefore, this module need no further description again with this regard. As additional elements only a diaphragm 45 and a cover blade 46 are arranged below the pressure divider 17, wherein the cover blade 46 serves to incorporate air pressure channels which partly are not shown in detail.

Loose stacking of the diaphragm disks 36 and 39 advantageously allows lifting off of those disks from each other which enables setting of the start point independent of the ratio coefficient. The ratio coefficient is determined by the ratio between the active area of the diaphragm 32 and the active area of the diaphragm 30 and may be changed by the setting of the pressure divider. The start point is provided by the point at which the divided input pressure $P_X$ exceeds the start point pressure $P_W$. By applying the pressure $P_M$ the output pressure $P_A$ may be displaced in direction of the ordinate. This matter of fact may be taken in detail from the above-mentioned German Pat. No. 25 29 457.

The proportional response and the sensitivity of the above-described pneumatic modules are excellent since nearly no friction appears in the total diaphragm system. Furthermore, such a module may be assembled in a simple and inexpensive manner by assembling it stage-by-stage under intermediate arrangements of diaphragms and blocking in of the diaphragm disks. Thereafter the module is clamped together, for instance by means of screws and nuts. The package of diaphragms and disks need no clamping; moreover, this package is sealed by its design when pressure is applied.

As used herein, tightening means sealing.

The embodiments of the invention in which an exclusive property or rights is claimed are defined as follows:

1. A diaphragm module for pneumatic control systems comprising at least a pressure comparing stage for converting an applied pressure difference into a force and a force/pressure transducer being controlled by the pressure comparing stage wherein, in a multiple-part housing, chambers are formed by comparing and tightening diaphragms with pressures to be compared with each other being applied to said chambers and wherein by means of diaphragms disks loosely piled up in the housing and being admitted by the comparing diaphragms the resulting force is accordingly converted into a displacement of the diaphragm disks, characterized by the following features:
   a. said diaphragm disks comprise central pin projections and recesses, wherein said pin projections of a diaphragm disk is inserted into a recess of an adjacent diaphragm disk via a central hole provided in a corresponding one of said diaphragms, respectively;
   b. said housing and the diaphragm disks comprise annular ribs which are pressed into corresponding diaphragms for tightening when pressure is applied; and,
   c. at least two diaphragm disks comprise in their planar surfaces concentric annular grooves which are engaged by annular collars of related diaphragms.

2. The diaphragm module according to claim 1, characterized in that the central pin projections comprise a length which exceeds the depth of the related central recesses by a certain amount with said amount being smaller than the thickness of the intermediately arranged diaphragm.

3. The diaphragm module according to claim 1, characterized in that the annular grooves are provided in the outer surfaces of the diaphragm disk terminating the package of diaphragm disks.

* * * * *